US005330695A

United States Patent [19]

Seeler

[11] Patent Number: 5,330,695

[45] Date of Patent: Jul. 19, 1994

[54] METHOD OF MANUFACTURING DIAPHRAMS FOR DYNAMIC MICROPHONES

[75] Inventor: Charles E. Seeler, Evanston, Ill.

[73] Assignee: Shure Brothers, Inc., Evanston, Ill.

[21] Appl. No.: 88,794

[22] Filed: Jul. 8, 1993

Related U.S. Application Data

[62] Division of Ser. No. 734,213, Jul. 22, 1991, Pat. No. 5,259,036.

[51] Int. Cl.$^{5}$ ........................ B32B 31/06; B32B 31/20

[52] U.S. Cl. .................................... 264/134; 156/245; 156/250; 156/307.5; 264/153; 264/297.5; 264/320

[58] Field of Search ............ 156/242, 245, 250, 307.5; 264/134, 135, 153, 297.5, 319, 320

[56] References Cited

U.S. PATENT DOCUMENTS

| | | | |
|---|---|---|---|
| 3,132,713 | 5/1964 | Seeler | 381/168 |
| 3,834,486 | 9/1974 | Tsuge et al. | 181/165 |
| 4,340,557 | 7/1982 | Gross | 264/320 |
| 4,353,243 | 10/1982 | Martin | 73/23.1 |
| 4,790,972 | 12/1988 | Coffman | 264/153 |
| 4,812,186 | 3/1989 | McConnell et al. | 156/245 |
| 4,904,318 | 2/1990 | Goto et al. | 264/153 |
| 4,959,189 | 9/1990 | Rohrbacher | 264/135 |

*Primary Examiner*—Jay H. Woo
*Assistant Examiner*—Robert B. Davis
*Attorney, Agent, or Firm*—Allegretti & Witcoff, Ltd.

[57] ABSTRACT

A diaphragm for microphones having a laminate structure which imparts damping characteristics to the diaphragm is disclosed. The laminate comprises upper and lower resilient layers composed of a plastic film. The upper and lower layers constrain a center layer composed of an elastomeric material having a high dissipation of vibratory shear motion. Manufacturing techniques for making such diaphragms are disclosed.

8 Claims, 1 Drawing Sheet

METHOD OF MANUFACTURING DIAPHRAMS FOR DYNAMIC MICROPHONES

This is a division of Ser. No. 07/734,213, filed Jul. 22, 1991, now U.S. Pat. No. 5,259,036, granted Nov. 2, 1993.

BACKGROUND OF THE INVENTION

This invention relates to sound-responsive diaphragms for electroacoustic transducers such as microphones and the like. More particularly, the invention relates to a novel laminate diaphragm construction which provides superior damping characteristics, and to methods of manufacturing such a diaphragm.

BACKGROUND ART

Diaphragms are mechanical devices found in microphones which flex back and forth when subjected to incident acoustic waves. Microphone diaphragms typically carry a voice coil which vibrates while positioned in a magnetic field. The vibrations of the diaphragm cause the voice coil to vibrate in the magnetic field, resulting in the conversion of acoustic energy incident upon the diaphragm into electric energy. Background information on microphone construction and on diaphragms for microphones can be found in two patents previously issued to the inventor of the present invention, U.S. Pat. No. 3,420,883 and U.S. Pat. No. 3,132,713.

Diaphragms such as those under consideration here have natural resonance frequencies of vibration. Overtone vibration, where the microphone vibrates at one or more higher modes of vibration, causes the response signal to be altered. When, at a certain frequency, the diaphragm is acoustically excited, it is desirable that the ensuing mechanical vibrations be of the same frequency, and that the overtone vibration be substantially reduced eliminated. This objective is usually accomplished by damping the diaphragm. Heretofore, the prior art solutions to diaphragm damping have been to provide selectively disposed regions regions of and bridging deformations on the diaphragm to improve its damping characteristics.

SUMMARY OF THE INVENTION

The present invention represents a departure from and an improvement to the prior art attempts to impart damping characteristics to dynamic microphones. The present invention calls for a diaphragm for an electroacoustic transducer in which the diaphragm is formed in a laminar structure. The outer layers of the diaphragm are typically composed of plastic film such as polyethylene terephthalate, commonly known as MYLAR. The center layer of the laminate is made of an elastomeric material having a high dissipation of vibratory shear motion, such as, for example, butyl or polyacrylic rubber or epoxy. The two outer layers are preferably made of the same material and are bonded together (and thus constrained) to the center layer.

The molding operation will stretch both the outer and the inner layer of the laminar structure. Both layers will yield because they are softened in the heat of the molding operation. The temperature of the molding operation not only softens these outer layers, but also will cure the rubber of the center layer. After molding, there is no interior stress within the laminate, and there is no shear stress in the center layer. Only when the diaphragm vibrates and certain sections of the diaphragm flex, will the center layer experience alternating shear strains, which dampen the diaphragm's motion.

An object of the present invention to further improve diaphragm performance by providing a diaphragm structure which has sufficient damping properties to minimize unwanted higher modes of vibration of the diaphragm.

A further object of the present invention to provide a diaphragm that has improved response characteristics, yet which is compatible with prior art techniques for reducing unwanted vibratory motion. Furthermore, depending on the choice of materials chosen for the outer layers and on the choice of materials for the elastomer, the diaphragm of the present invention may be used in a wide variety of electroacoustic transducers.

Another object of the present invention is to provide simple and low cost techniques for manufacturing such diaphragms. Other objects and advantages of the present invention will become more apparent hereinafter.

BRIEF DESCRIPTION OF THE DRAWINGS

The invention can be more readily comprehended by referring to the drawings wherein like numerals in the various view refer to like elements and wherein.

DETAILED DESCRIPTION OF THE PREFERRED EMBODIMENT AND METHODS OF MAKING THE INVENTION

Figure 2:
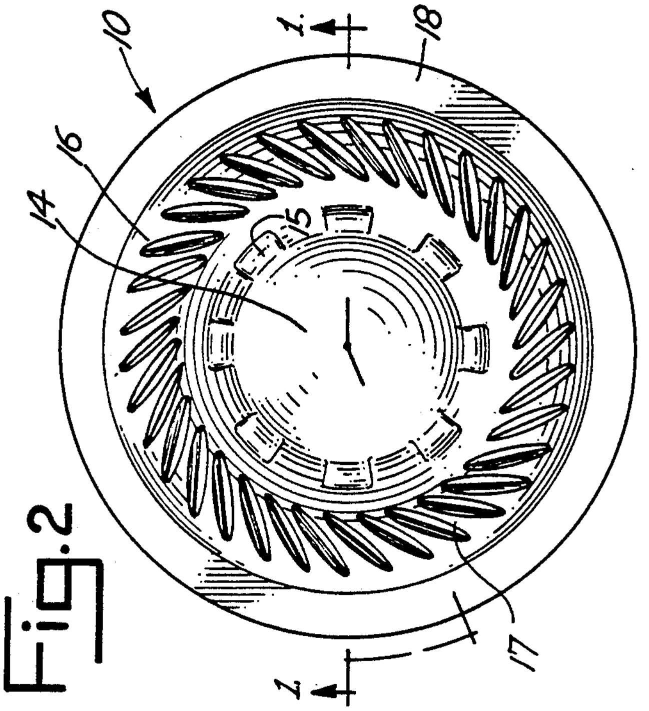
FIG. 2 is a plan view of the diaphragm of FIG. 1.
Figure 1:
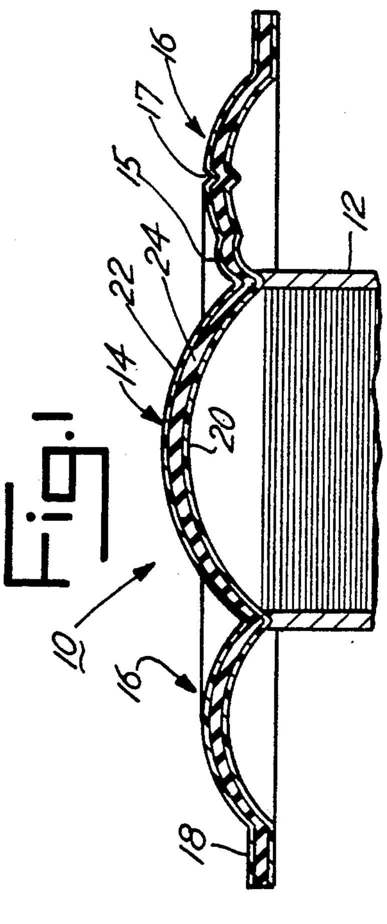
FIG. 1 is a cross-sectional view of a microphone diaphragm according to the present invention with the thickness of the diaphragm greatly exaggerated in order to illustrate its laminate structure.

FIG. 1 shows in cross-section a diaphragm 10 for a microphone which carries a voice coil 12. The particular overall shape to be imparted to the diaphragm 10 is not critical for purposes of describing the present invention. In the preferred embodiment, the diaphragm is round when viewed from above, as can be seen by referring to FIG. 2, a plan view of the diaphragm of FIG. 1. The diaphragm 10 has a central or inner spherical section 14 (the "dome") and an outer hemitoroidal section 16 concentric with the dome 14. The diaphragm 10 as illustrated in FIG. 1 shows the dome 14 and outer hemitoroidal section 16 in cross section. Bridge formations 15 span portions of the region between the dome 14 and the outer hemitoroidal section 16. Inwardly projecting serrations 17 are provided in the hemitoroidal section 16 to increase the rigidity of the diaphragm and to influence its compliance. The peripheral rim 18 portion of the diaphragm 10 is cemented to a structure in the microphone to hold the diaphragm in proper operating position.

The thickness of the diaphragm 10 in FIG. 1 is greatly exaggerated in order to illustrate its laminar structure. The cross-section of the diaphragm is shown magnified in FIG. 3. The outer layers 20 and 22 are made from a resilient material, such as plastic film. In the preferred embodiment, outer layers 20 and 22 are made from polyethylene terephthalate, commonly known as MYLAR (a polyester film) RTM. It has been found that the thickness of the outer layers is preferably of between 60 and 150 micro-inches in thickness, and a thickness of approximately 120 micro-inches is most suitable. The inner and outer layers 20 and 22 need not be, but ideally are made from the same material.

The center layer 24 of the diaphragm is preferably made of an elastomeric material having a high dissipation of vibratory shear motion, meaning that it imparts dynamic damping characteristics to the diaphragm when constrained between the outer layers 20 and 22. In addition to having damping characteristics, the center layer 24 is chosen such that it has adhesive qualities whereby center layer 24 can be more readily bonded to the outer layers 20 and 22. Suitable materials for the center layer are the synthetic rubbers butyl and polyacrylic rubber, but those of ordinary skill in the art will appreciate that other rubbers, and other elastomeric materials, may be suitable depending on the applications intended. The thickness of the center layer may be varied, depending again on the desired damping characteristics and applications, but for general usage the thickness of the center layer is chosen to make the overall thickness of the diaphragm to be between 900 and 2,000 micro-inches.

Figure 3:
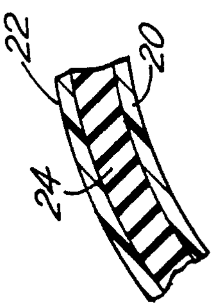
FIG. 3 is a magnified cross-sectional view of the diaphragm of FIG. 1 showing in more detail its laminate structure.

With the laminar structure shown in FIGS. 1 and 3, when the diaphragm vibrates, the outer layer 22 is alternately stretched and constricted, while-in opposition-the inner layer 20 is constricted and stretched. An alternating shear strain is thereby induced in the center layer 24. The shear strain causes shear forces to be induced into the center layer. Due to the center layer's physical properties, the desired damping characteristics are thereby imparted to the laminar structure.

Manufacturing techniques for mass-producing the diaphragm of FIG. 1 simply and at low costs have been invented and representative examples are described hereinbelow. The following description are exemplary, and are not intended to limit the scope of the appended claims.

In a first technique, one surface of a flat sheet of resilient material such as 120 micro-inch thick MYLAR film is painted with a liquid consisting of either butyl or polyacrylic uncured rubber dissolved in toluol or methyl ethyl ketone. Of course, other well-known methods may be employed to apply the uncured rubber solution to the MYLAR film. The "paint" is allowed to dry, at which time its surface is sticky. When the solution has dried, there is no solvent present, and the remaining residue is rubber. The layer must be dry, and if it is not dry, the remaining solvent would boil during the subsequent pressing operation, and the blank obtained would be of uneven thickness.

When the uncured rubber layer has dried, a second sheet of 120 micro-inch thick MYLAR (a polyester film) is laid upon the sticky surface and allowed to adhere. At this point, the resulting laminate has an uneven thickness, assuming that the uncured rubber layer was not perfectly evenly applied to the first sheet.

The laminate is then compressed between two flat steel plates at a temperature and pressure and for a period of time sufficient to permit the uncured rubber layer to spread evenly between the MYLAR sheets to a desired thickness, without curing the rubber. In the present example, the laminate is compressed between flat and heated steel plates with a pressure of 2,000 PSI and at a temperature of 250° F. for five minutes. The applied heat lowers the viscosity of the rubber layer and allows it to flow between the two layers of MYLAR. The laminate is compressed such that the desired average thickness of the laminate is attained. With small variation of the average thickness, the resulting thickness of each laminate will typically range between 900 and 2,000 micro-inches, but, of course, other thicknesses are possible.

Round disks called "blanks" are then punched from the laminate. The blanks are inserted into a molding fixture, and then pressed against a heated metal surface having the desired diaphragm contour formed in it. The necessary pressure may be exerted by compressed air, or by a suitably shaped heat resistant rubber (e.g., silicone rubber). In the present example, the applied pressure is 100 PSI, at a temperature of 380° F. and for a molding and curing time of about two minutes. Under these conditions, a contoured diaphragm is formed having a cured rubber interlayer between the two outer MYLAR layers. The process is completed by removing the blanks from the mold.

Figure 4:
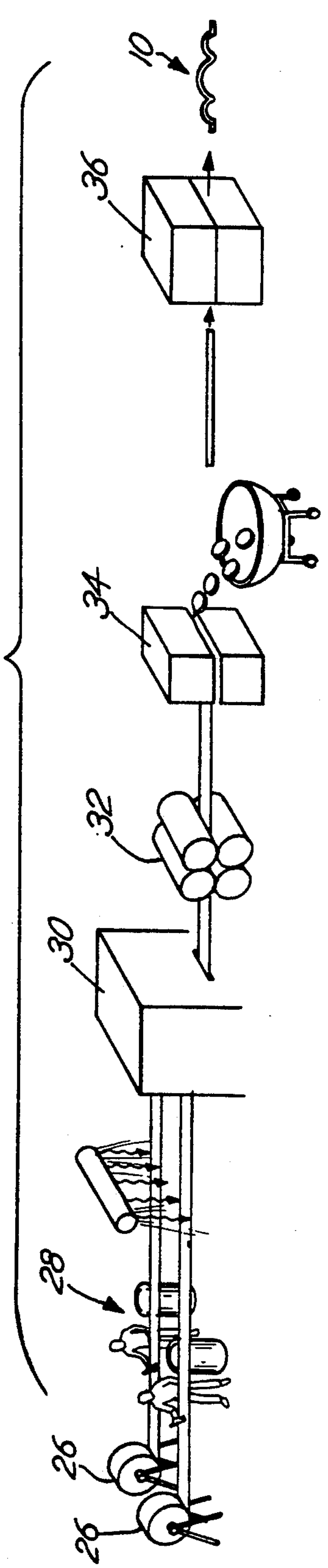
FIG. 4 is an illustration of a method for manufacturing a microphone diaphragm embodying the principles of the present invention.

FIG. 4 is an illustration of one possible variation of the technique. Strips or sheets of plastic film such as MYLAR are dispensed from reels 26 and pulled through a painting and drying station 28 where the uncured rubber solution is applied to the MYLAR and allowed to dry. The uncured rubber layer can be applied to either one or both strips of MYLAR. At station 30 the strips or sheets are combined and compressed in one or more hot rolling mills 32, to the desired thickness without curing the rubber. The blanks are punched out at the punching station 34 and then fed into a molding and curing press 36, where the rubber is pressed and cured to the desired diaphragm contour.

Those of ordinary skill in the art will recognize that variations in the thickness and composition of the diaphragm from the exemplary parameters described herein may be necessary or advisable depending upon the particular requirements of the diaphragm. For example, other elastomeric materials besides butyl or polyacrylic rubber may be chosen. Similarly, plastic films other than MYLAR (a polyester film) may be chosen for the outer layers. Also, it may even be advisable to provide for multiple or intermediate layers in the laminar structure in order to achieve the desired damping characteristics.

While I have shown and described presently preferred embodiments of the present invention, it will be apparent that the invention may be otherwise embodied within the scope of the appended claims.

What is claimed is:

1. A method of manufacturing diaphragms comprising the steps of:

(a) applying a solution of uncured rubber to a first sheet of plastic film and allowing said rubber solution to dry to form a rubber layer;

(b) applying a second sheet of plastic film to said rubber layer to form a laminar structure with said first sheet of plastic film;

(c) compressing said laminar structure at a temperature and pressure and for a period of time sufficient to permit said uncured rubber to spread evenly between said first and second plastic sheets to a desired thickness without curing said rubber;

(d) punching blanks from said laminar structure;

(e) pressing said blanks in a mold having a predetermined contour at a temperature and pressure sufficient to cure said rubber thereby imparting a predetermined shape to said blanks; and (f) releasing said blanks from said mold.

2. A method of manufacturing diaphragms comprising the steps of:

(a) dispensing first and second sheets of plastic film from reels of said plastic film;

(b) applying a solution of uncured rubber to at least one of said first and second sheets of plastic film and allowing said solution to dry to form a rubber layer;

(c) forming a laminar structure of said sheets of plastic film with said rubber layer between said first and second sheets;

(d) compressing said laminar structure at sufficient temperature and pressure and for a period of time sufficient to permit said uncured rubber to spread evenly between said first and second plastic sheets to a desired thickness without curing said rubber;

(e) punching blanks from said laminar structure;

(f) pressing said blanks in a mold having a predetermined contour at a temperature and pressure sufficient to cure said rubber, thereby imparting a predetermined shape to said blanks; and (g) releasing said blanks from said mold.

3. The method as claimed in claim 2, wherein said step of compressing said laminar structure comprises the step of compressing said laminar structure between flat and heated steel plates at a pressure of 2,000 PSI, and at a temperature of 250° F. for five minutes.

4. The method of claim 2, wherein said laminar structure is compressed to a thickness of between 900 and 2,000 micro-inches.

5. The method as claimed in claim 2, wherein said first and second plastic sheets are polyethylene terephthalate film of between 60 to 150 micro-inches in thickness.

6. The method as claimed in claim 2, wherein said solution of uncured rubber is composed of a polyacrylic rubber solution dissolved in a ketone.

7. The method as claimed in claim 2, wherein said solution of uncured rubber is composed of a butyl rubber solution dissolved in a ketone.

8. The method as claimed in claim 2 wherein said solution of uncured rubber is applied by painting.

* * * * *